Jan. 2, 1923.
O. POMILIO.
REDUCTION GEAR FOR AIRPLANES.
FILED APR. 14, 1919.
1,441,114
3 SHEETS-SHEET 3
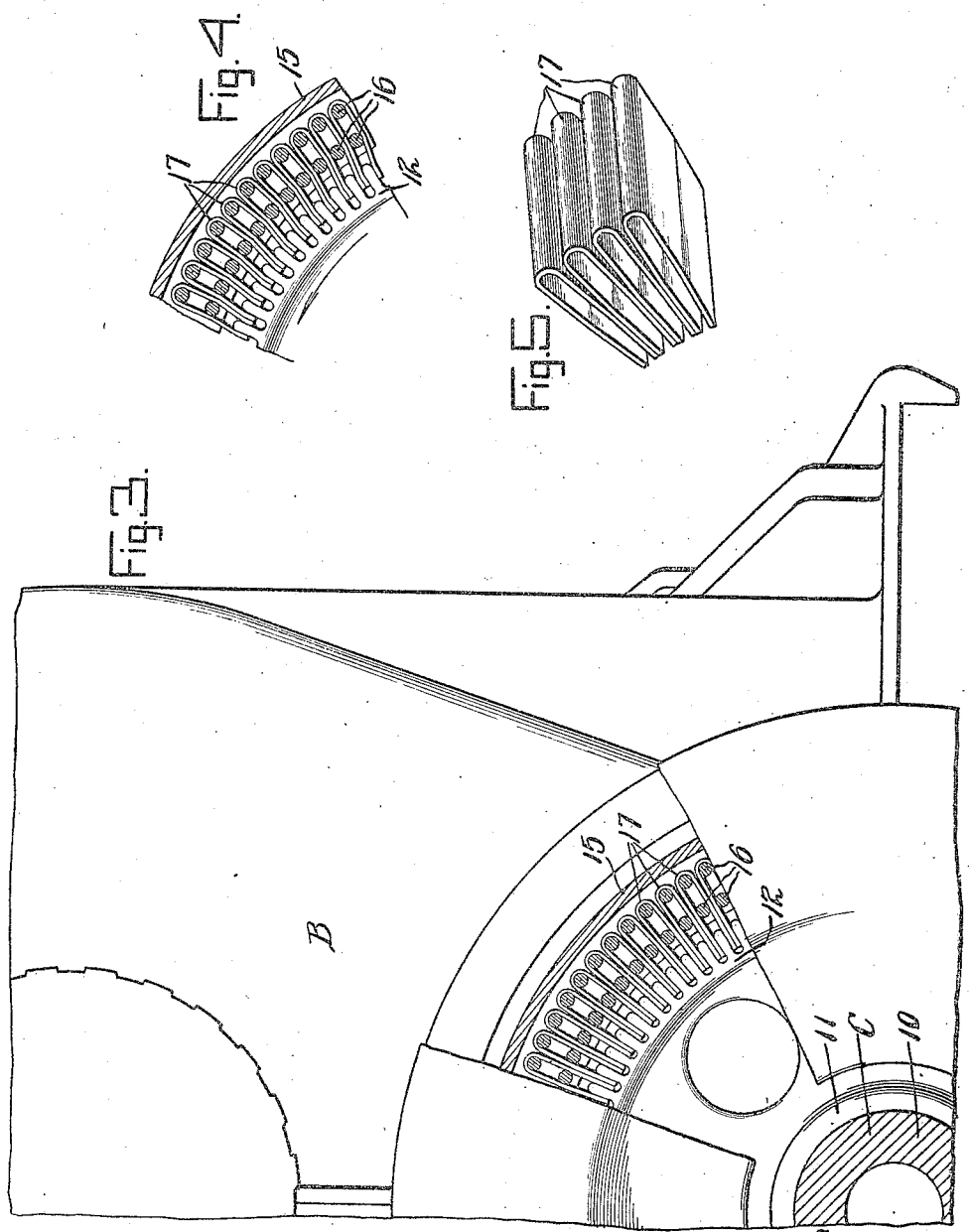
Inventor
Ottorino Pomilio
By
Attorney Patented Jan. 2, 1923.

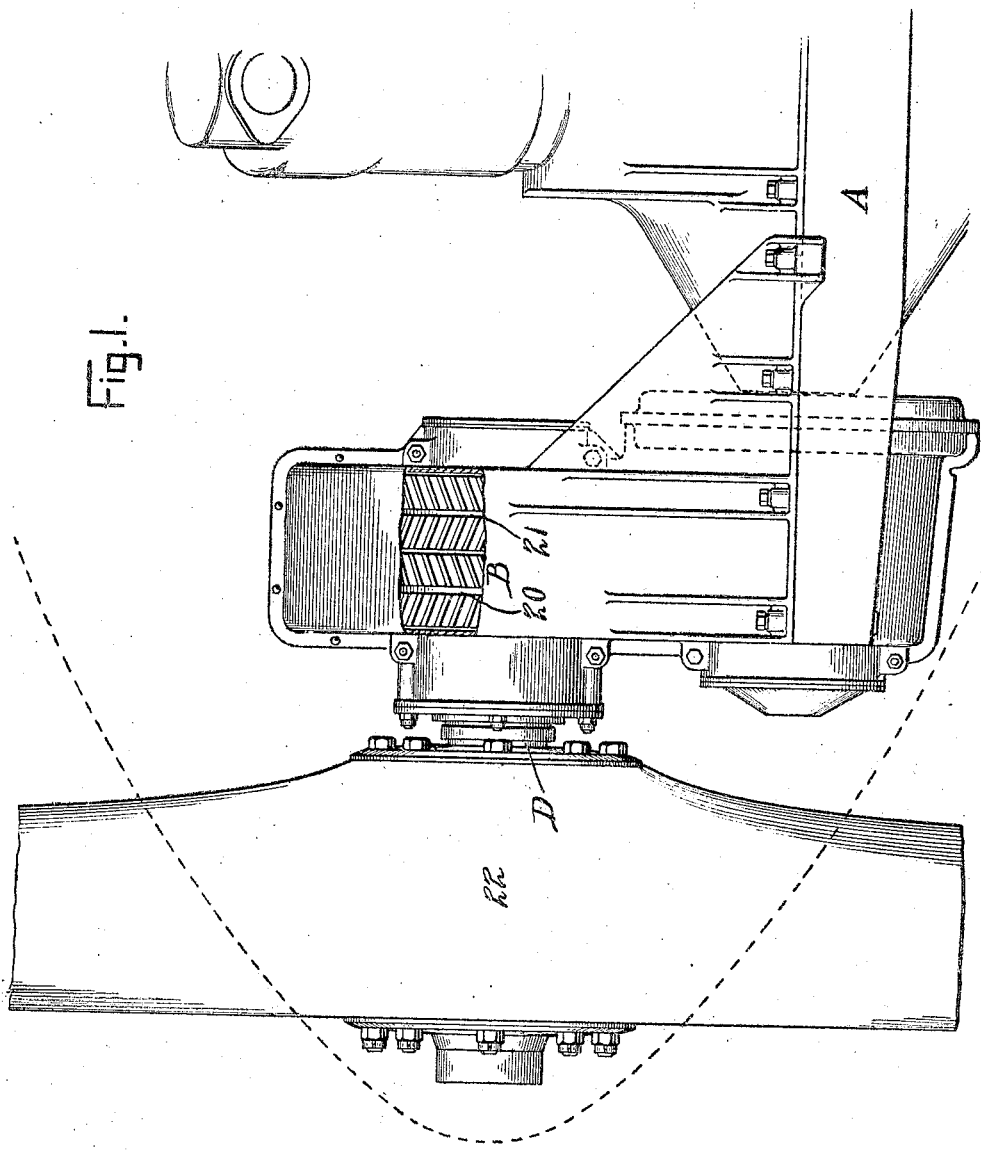

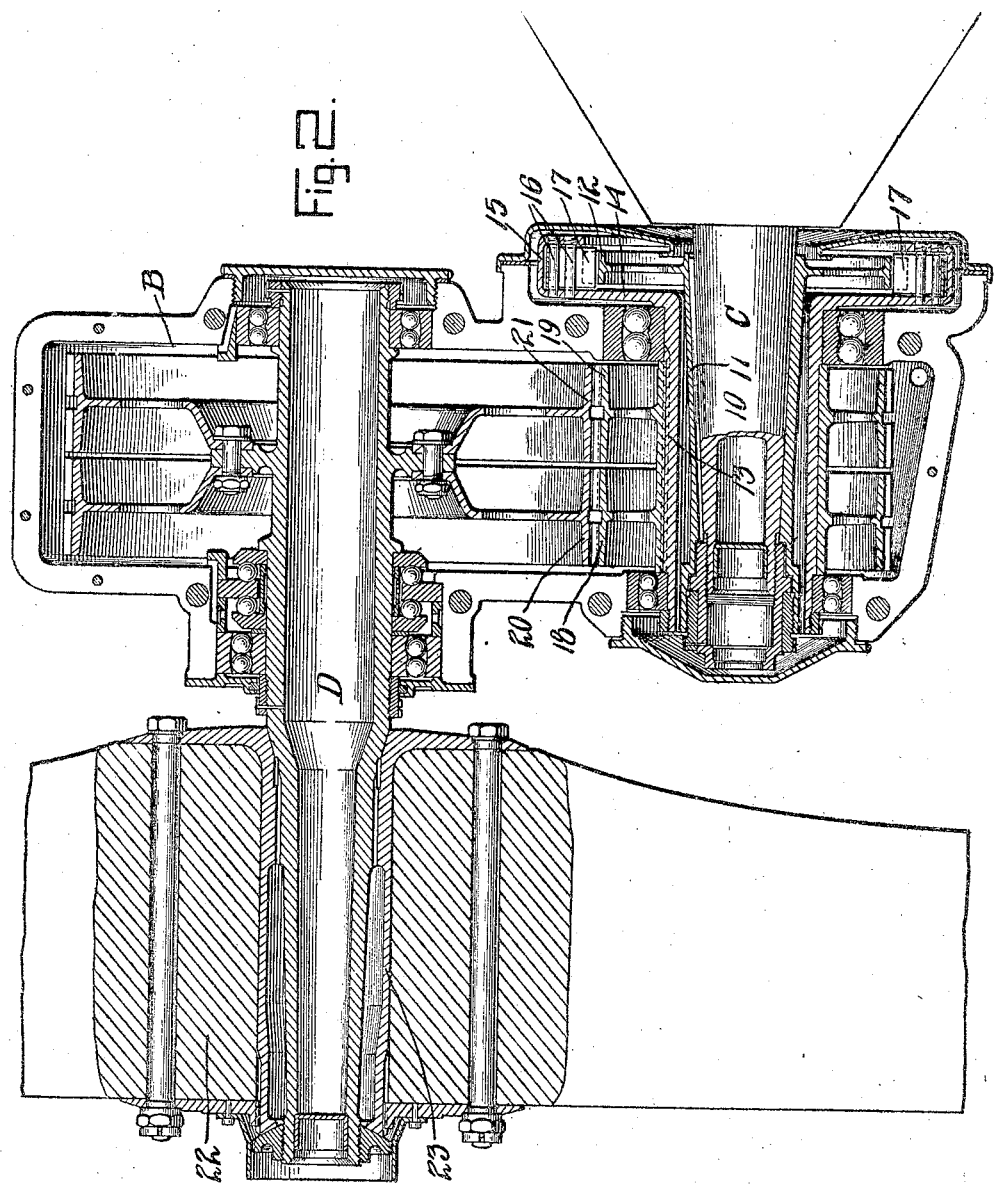

1,441,114

UNITED STATES PATENT OFFICE.

OTTORINO POMILIO, OF INDIANAPOLIS, INDIANA, ASSIGNOR TO POMILIO BROTHERS CORPORATION, OF NEW YORK, N. Y., A CORPORATION OF NEW YORK.

REDUCTION GEAR FOR AIRPLANES.

Application filed April 14, 1919. Serial No. 290,017.

*To all whom it may concern:*

Be it known that I, OTTORINO POMILIO, a citizen of Italy, residing at Indianapolis, Marion County, and State of Indiana, have invented and discovered certain new and useful Improvements in Reduction Gears for Airplanes, of which the following is a specification.

In the construction of the driving mechanism for the propeller of an airplane it is common to employ a reduction gear interposed between the motor shaft and the propeller shaft for the purpose of reducing the speed of the propeller shaft in relation to the speed of the motor shaft. My said invention relates to an improved construction and arrangement of such a gear whereby the transmission of power from the engine shaft to the propeller shaft is through an elastic or yielding connection, thus providing for the cushioning of the vibrations or "poundings" of the motor to the end that a smooth and regular motion is imparted to the propeller and the "jerky" motion experienced with gears of the ordinary type is avoided. The invention also has for its purpose to elevate the axis of thrust above the center of gravity and thus insure greatest stability. A further purpose is to provide a gear which may be quickly and conveniently placed and removed from position so that a gear of one ratio of reduction may be quickly substituted for another and thus provide for a range of propeller speeds corresponding to the requirements of different types of airplanes. A further purpose is to provide a yielding connection which will serve equally well as a coupling for shafts used to transmit power in devices other than airplanes. These and other purposes, which may appear or develop, are accomplished by the construction and arrangement of parts hereinafter more fully described and claimed.

Referring to the accompanying drawings which are made a part hereof, and on which similar reference characters indicate similar parts, Figure 1 is a side elevation showing those portions of an airplane structure adjacent and including the motor shaft and propeller shaft connected by my improved reduction gear;

Figure 2, a longitudinal section through the parts,

Figure 3, view showing a part of the structure in end elevation and part in cross section, and Figures 4 and 5 detail views showing parts on an enlarged scale.

In said drawings the portions marked A represent the steel or aluminum beams forming a part of the airplane in which the motor and other mechanism is supported; B the casing in which the gear is encased; C the motor shaft and D the propeller shaft.

These various parts are of any appropriate construction and arangement and require no special description the invention relating particularly to the reduction gear by which the motor shaft C and the propeller shaft D are coupled together which will now be described.

On the motor shaft C is secured a hub 10 carrying a sleeve 11 on the inner end of which is formed a gear-wheel 12 which consists of a rim connected to said sleeve by an appropriate web or spokes, said rim being formed with gear-teeth in its periphery, as shown. Surrounding said sleeve 11 is another sleeve 13 having a radially projecting disk 14 with an overhanging rim 15 with a series of cross pins 16 mounted therein corresponding to the gear-teeth on the rim of wheel 12. The pins 16 and teeth on wheel 12 are spaced a short distance apart and are connected by elastic connections consisting of U-shaped spring members 17 which straddle the pins and engage at their free ends the teeth of wheel 12. They extend entirely around the wheel. On the sleeve 13 are mounted gears 18 and 19 with angular teeth extending from the outer side to a central groove in the face of each wheel. These gears 18 and 19 in turn mesh with gears 20 and 21 formed with correspondingly shaped teeth and secured on the propeller shaft D and thus transmit motion thereto.

The hub 22 of the propeller is rigidly secured on a sleeve 23 which is secured to said propeller shaft in any appropriate manner.

By this arrangement it will be seen that the pulsations and vibrations of the motor are transmitted to the propeller shaft through the spring or elastic connection formed by the springs 17 so that they are taken up or distributed throughout said springs with the result that a regular, smooth and even motion is imparted to the propeller shaft. The elevation of the axis of thrust above the center of gravity also increases the stability of the airplane and as this entire gear is readily removable and replaceable by reason of the screw-threaded securing devices shown, gears of different ratio of speed reduction may be substituted, one for the other, so that any speed for the propeller shaft most efficient for any particular service or type of plane may be readily provided.

Having thus fully described my said invention, what I claim as new and desire to secure by Letters Patent, is:

1. A coupling for airplanes comprising a driving gear, a driven member having a rim overhanging the driving gear, a plurality of series of radially spaced axially extending pins on said driven member and separable U-shaped spring members each enclosing a plurality of said pins and connected to said driving member, substantially as set forth.

2. A coupling for airplanes comprising a driving gear, a driven element having a rim overhanging the driving gear and provided with spaced pins extending parallel with the axis of rotation, said pins being spaced opposite the teeth on the driving gear, and separable U-shaped spring members adapted to form a driving connection between the driving gear and the driven element.

3. A coupling for airplanes comprising a driving gear, a driven element having a rim overhanging the driving gear and provided with spaced pins extending parallel with the axis of rotation, said pins being spaced corresponding to the teeth on the driving gear, and separable U-shaped spring members adapted to be passed around and between the spaced pins and having their ends secured between the teeth of the driving gear.

4. A coupling for airplanes comprising a driving gear, a driven element having a rim overhanging the driving gear and provided with spaced pins extending parallel with the axis of rotation, said pins being spaced opposite the teeth on the driving gear, and separable U-shaped spring members adapted to be passed around and between the spaced pins and having their ends secured between the teeth of the driving gear, each space thereof adapted to receive an end of a spring member opposite the tooth adjacent said space and also an end of the spring member adjacent the first mentioned spring member and opposite the tooth on the other side of the said space.

In witness whereof, I have hereunto set my hand and seal at Indianapolis, Indiana, this 27th day of January, A. D. nineteen hundred and nineteen.

OTTORINO POMILIO. [L. S.]

Witnesses:
E. W. BRADFORD,
M. L. SHULER.